US009154717B2

(12) United States Patent
Ferrano et al.

(10) Patent No.: US 9,154,717 B2
(45) Date of Patent: Oct. 6, 2015

(54) AERIAL CAMERA SYSTEM AND METHOD FOR CORRECTING DISTORTIONS IN AN AERIAL PHOTOGRAPH

(75) Inventors: Gert Ferrano, Diepoldsau (CH); Bernd Walser, Heerbrugg (CH); Kristian Morin, Calgary (CA)

(73) Assignees: LEICA GEOSYSTEMS AG, Heerbrugg (CH); NOVATEL INC., Calgary (CA)

( * ) Notice: Subject to any disclaimer, the term of this patent is extended or adjusted under 35 U.S.C. 154(b) by 938 days.

(21) Appl. No.: 13/320,952

(22) PCT Filed: May 3, 2010

(86) PCT No.: PCT/EP2010/055987
§ 371 (c)(1),
(2), (4) Date: Nov. 17, 2011

(87) PCT Pub. No.: WO2010/133445
PCT Pub. Date: Nov. 25, 2010

(65) Prior Publication Data
US 2012/0062730 A1    Mar. 15, 2012

(30) Foreign Application Priority Data

May 19, 2009    (EP) .................................... 09160615

(51) Int. Cl.
*H04N 5/369* (2011.01)
*G01C 11/02* (2006.01)
(Continued)

(52) U.S. Cl.
CPC .............. *H04N 5/3692* (2013.01); *G01C 11/02* (2013.01); *G03B 9/00* (2013.01); *H04N 7/18* (2013.01)

(58) Field of Classification Search
CPC ..................................................... G01B 11/022
See application file for complete search history.

(56) References Cited

U.S. PATENT DOCUMENTS

| 3,744,387 A | 7/1973 | Fuller |
| 5,460,341 A | 10/1995 | Katsuyama et al. |

(Continued)

FOREIGN PATENT DOCUMENTS

| CN | 1556374 A | 12/2004 |
| DE | 195 02 045 A1 | 7/1996 |

(Continued)

OTHER PUBLICATIONS

Tohru Yotsumata et al.: "Investigation for mapping accuracy of the airborne digital sensor ADS40" Integrated Remote Sensing at the Global, Regional and Local Scale Nov. 15, 2002.

(Continued)

*Primary Examiner* — Jorge L Ortiz Criado
*Assistant Examiner* — James Pontius
(74) *Attorney, Agent, or Firm* — Maschoff Brennan

(57) ABSTRACT

The invention relates to a method for correcting a distortion in an aerial photograph caused by a flight movement in the forward direction. The aerial photograph is captured by a surface sensor, the sensor lines of which sensor are exposed at different, successive exposure times, so that each individual sensor line senses a strip of terrain of the terrain flow over at the different exposure times. A relative flight altitude above the strips of terrain captured by the respective sensor line is assigned to the individual sensor lines. Furthermore, a compensation factor is separately determined for each of the individual sensor lines, wherein the factor depends on an air speed of the flying object, a focal length of the aerial camera and the relative flight altitude assigned to the respective sensor line, and corrects the distortion in the aerial photograph for the lines based on the respective compensation factor.

15 Claims, 5 Drawing Sheets

(51) Int. Cl.
*G03B 9/00* (2006.01)
*H04N 7/18* (2006.01)

(56) References Cited

U.S. PATENT DOCUMENTS

| | | | |
|---|---|---|---|
| 5,668,593 | A | 9/1997 | Lareau et al. |
| 5,844,602 | A * | 12/1998 | Lareau et al. ............... 348/144 |
| 6,108,032 | A * | 8/2000 | Hoagland ..................... 348/144 |
| 6,256,057 | B1 * | 7/2001 | Mathews et al. ............. 348/144 |
| 6,373,522 | B2 * | 4/2002 | Mathews et al. ............. 348/144 |
| 8,223,202 | B2 * | 7/2012 | Rosenblum et al. .......... 348/144 |
| 2002/0149674 | A1 | 10/2002 | Mathews et al. |
| 2008/0138059 | A1 | 6/2008 | Julian et al. |
| 2008/0144964 | A1 * | 6/2008 | Soinio et al. ................. 382/275 |

FOREIGN PATENT DOCUMENTS

| | | | |
|---|---|---|---|
| DE | 199 32 065 A1 | | 2/2000 |
| EP | 1 570 314 B1 | | 4/2008 |
| WO | 2007/008159 A2 | | 1/2007 |

OTHER PUBLICATIONS

John C. Craig, "Comparison of Leica ADS40 and Z/I imaging DMC high-resolution airborne sensors", Proc. SPIE 5655, 271 (2005); doi:10.1117/12.579731.

Udo Tempelmann et al., "Photogrammetric software for the LH Systems ADS40 airborne digital sensor", International Archives of Photogrammetry and Remote Sensing, Amsterdam (2000) vol. 33, Part B2, pp. 552-559.

Ralf Reulke et al., "Iterative stereo reconstruction from CCD-line scanner images" Jan. 1, 2005, Computer Analysis of Images and Patterns Lecture Notes in Computer Science; Lncs, Springer, Berlin, De, pp. 112-119.

* cited by examiner

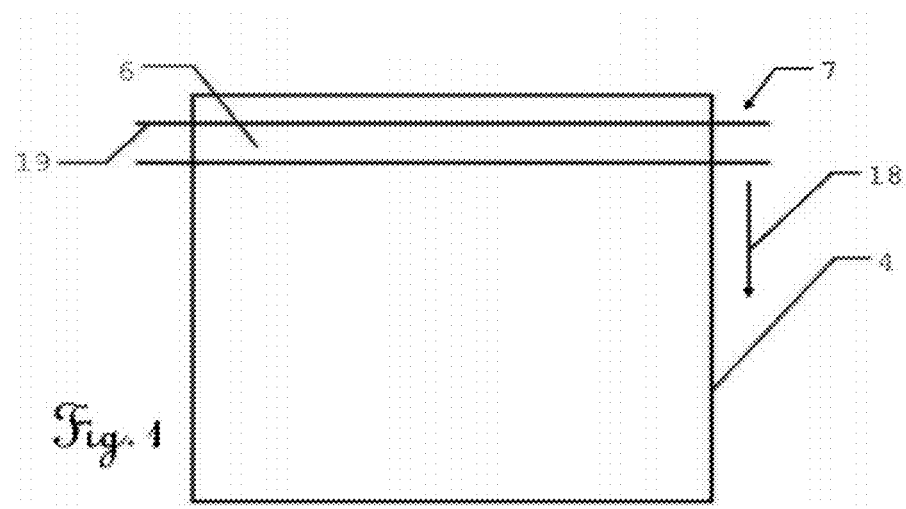
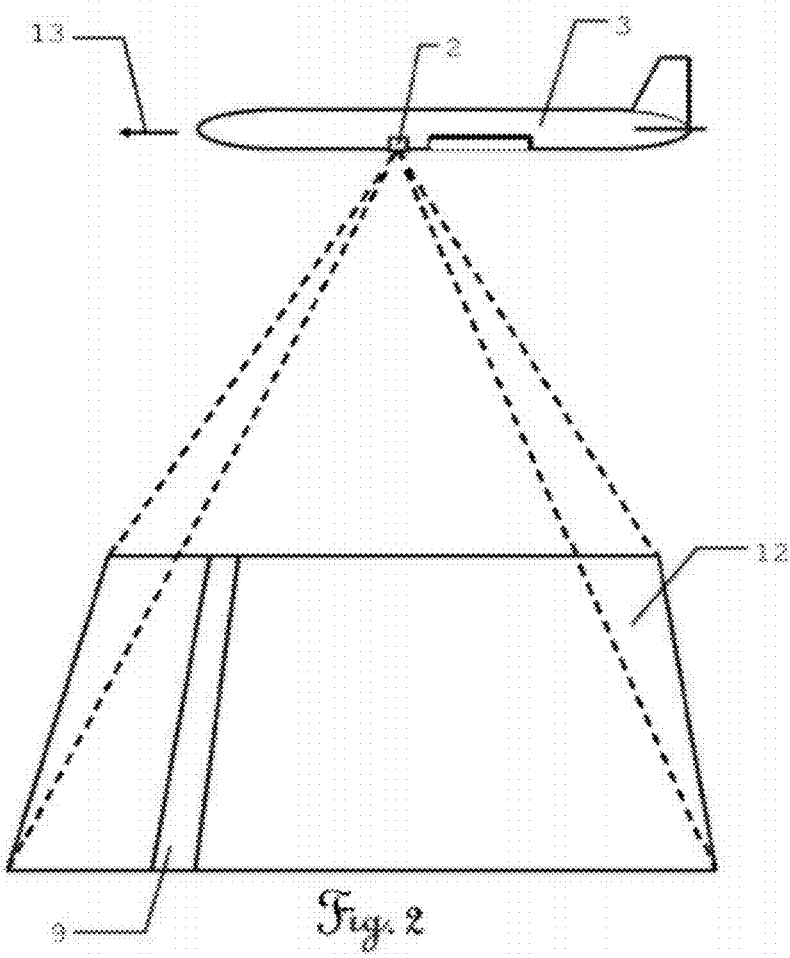

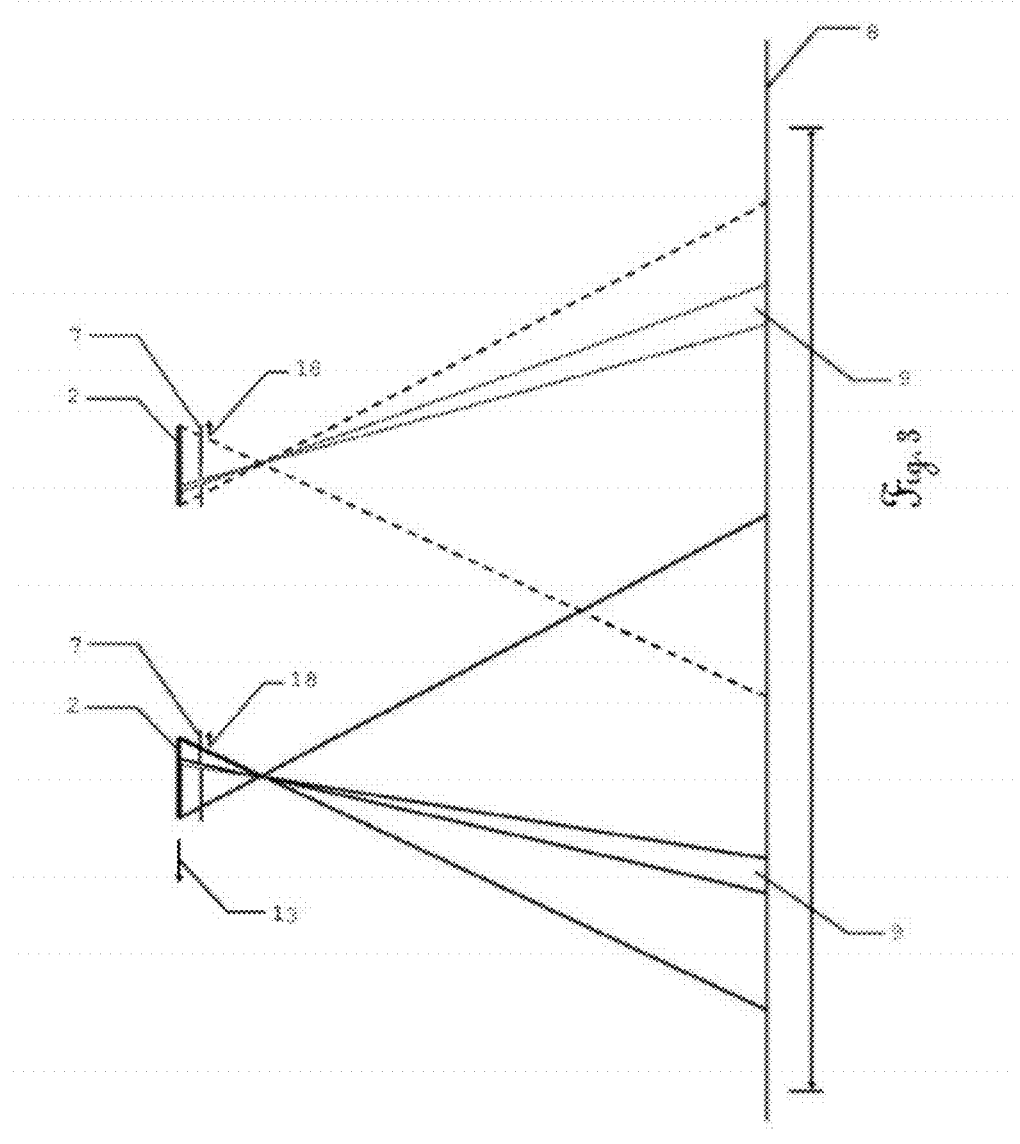

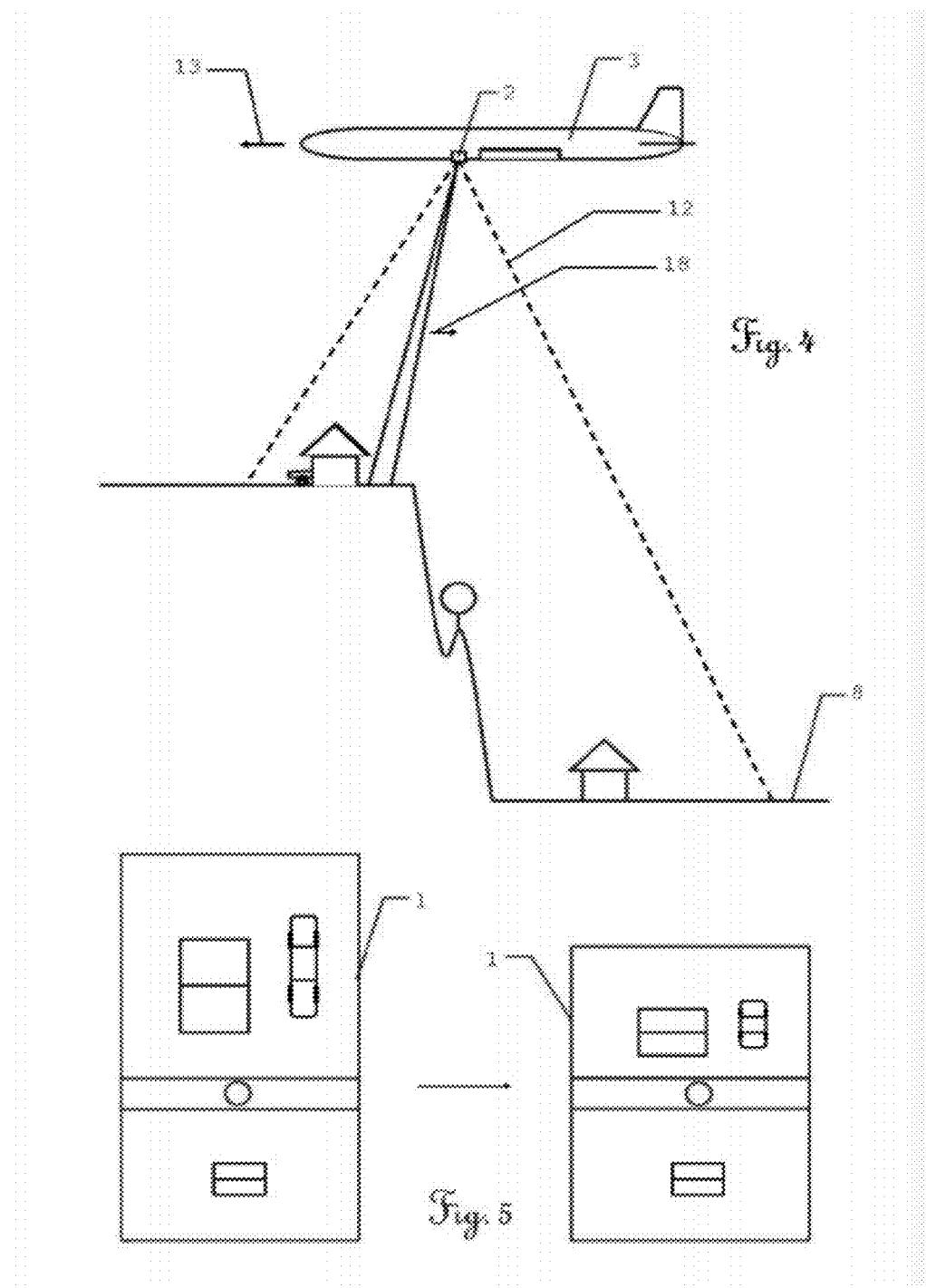

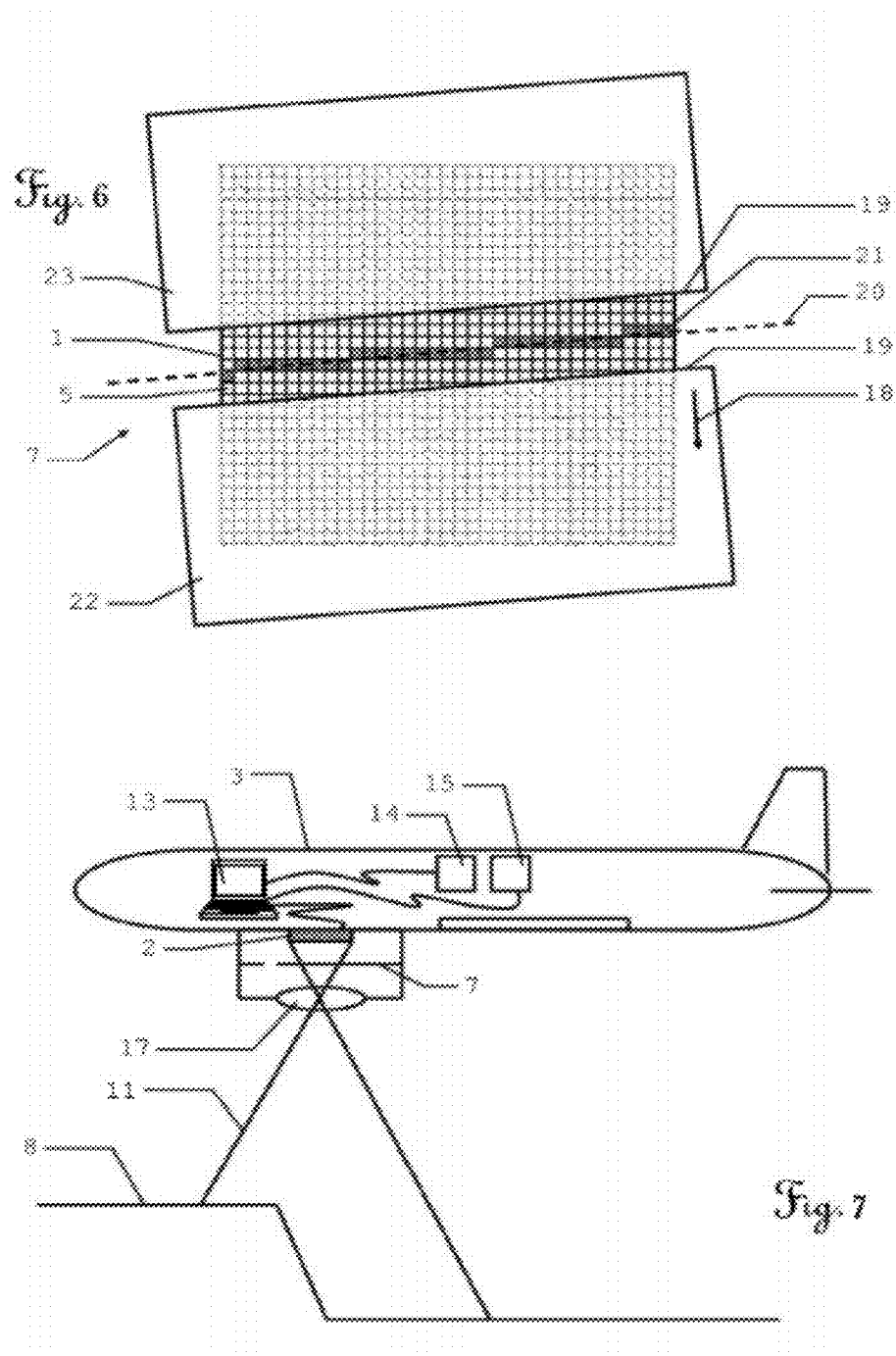

AERIAL CAMERA SYSTEM AND METHOD FOR CORRECTING DISTORTIONS IN AN AERIAL PHOTOGRAPH

FIELD OF THE INVENTION

The invention relates to a method for correcting a distortion, caused by a forward flight movement, in an aerial photograph that is taken with an aerial camera from a flying object, to a method for taking aerial images, to an aerial camera system, and to a computer product as set forth in the claims.

BACKGROUND

Aerial cameras with photosensitive electronic, mostly high resolution surface sensors have been known for a long time and are used for taking aerial images that are, for example, captured from a flying object moving at a specific air speed at a specific flight altitude. Known aerial cameras in this case typically have a central, global diaphragm shutter.

Such an aerial camera is described, for example, in publication document DE 199 32 065 A1.

In order to sharpen imaging, the photosensitive pixels (5) of the surface sensor which, in particular, comprises a multiplicity of CCD or CMOS rows, are brought into register with the image plane of the objective. Only small positional deviations between the image plane and the focal plane—that is to say the surface of the surface sensor—are permitted, depending on the focal length and the aperture ratio of the objective used.

It is known from sport photography that for the purpose of sharply imaging a runner, for example, the camera has to be panned during the exposure time in accordance with the movement of the runner What is obtained is a blurred image of the runner that has a so called motion blur.

The same problem also occurs with opto electronic reconnaissance systems that are used from aircraft. During the exposure time or integration time for, for example, a specific map square of the earth's surface that lies in the capture range of the aerial camera, a displacement of the map square to be taken occurs with reference to the aerial camera arranged in the flying object. This effect likewise then leads in the case of such photographs to fading and/or motion blur of the aerial images taken.

U.S. Pat. No. 5,460,341 discloses an aerial camera, it being possible to adjust the focal plane in various directions in order to compensate the focal drift, doing so by means of linear actuators. The aerial camera comprises a focal drift sensor that senses the position of the parts forming the imaging optics, and a temperature sensor that senses the temperature of various areas of the imaging optics. The computer simulation of specific values for the focal drift is then used to track the focal plane as a function of the values of the focal drift sensor and of the temperature sensor.

DE 195 02 045 discloses a focal plane with CCD rows of an aerial camera that can be moved perpendicular to the optical axis by means of a piezoelectric actuating element. The aim thereby is to compensate instances of image fading and/or motion blur that are caused during the exposure by the forward flight movement, and thus by the relative movement of the camera in relation to the terrain captured.

EP 1 570 314 B1 and U.S. Pat. No. 3,744,387 also describe aerial cameras that compensate forward flight movement by means of actuating elements that effect an appropriate tracking of the sensor and/or of the film.

Other known approaches to reducing image fading in the photographing of objects moving relative to the camera are directed towards shortening the exposure times.

Thus, it is known that in the case of the use of a slit diaphragm shutter, for example, it is possible to achieve shorter exposure times—in comparison with required exposure times for a central, global diaphragm shutter.

In the case of a slit diaphragm shutter, use is made of two diaphragm elements that are also denoted as curtains. In the basic position, in which no exposure is performed, a first of the two curtains is closed so that it completely covers the sensor, whereas the second curtain is open and does not cover the sensor. For the purpose of taking a picture, the first curtain is opened and moves, usually at constant speed, over the image. As soon as the desired exposure time is reached for the sensor line first exposed by the opening of the first curtain, the second curtain begins to close and to move over the image at, for example, a constant speed—and in the same direction as the first curtain. A slit diaphragm thus rolls or runs over the image, as it were.

The consequence of this type of diaphragm shutter is that individual locations of the surface sensor (that is to say the sensor lines that are respectively exposed and covered again one after another for exposure purposes) are exposed at different points in time. The respective sensor lines therefore exhibit different mean exposure times.

Consequently, it is possible—in comparison with the duration of exposure for central diaphragms—for the duration of exposure of the individual sensor lines to be greatly shortened. It is true that image fading and/or motion blur can thereby be reduced in photographs of objects moving relative to the camera. However, since in the case of aerial photographs the projected image is moved relative to the sensor and relative, in particular parallel, to the curtain slit diaphragm by the forward flight movement in the case of aerial photographs, the effect of the different exposure times of the individual sensor lines is that the aerial image of the terrain as sensed by the sensor is either compressed, that is to say squashed, or stretched, that is to say drawn out in length, depending on whether the slit diaphragm is displaced in the same or opposite direction as the projected image over the surface sensor.

WO 2007/08159 describes a method of photography—for example for sport photography—where use is made of a slit diaphragm shutter, the displacement of a moving object being determined from two photographs captured successively. A corrected image is formed as a function of this displacement and of the different exposure times of the individual sensor rows—this being done by appropriately modifying one of the two photographs captured.

However, it happens in the case of aerial photography that the drift rate of the projected image does not remain constant relative to the sensor during photographing, since the drift rate depends, inter alia, on the air speed and the flight altitude above the terrain to be captured. This can lead to undesired distortions in the aerial photographs.

SUMMARY

It is therefore an object of the invention to provide an improved method for correcting a distortion, caused by a forward flight movement, in an aerial photograph that is taken with a slit diaphragm shutter aerial camera from a flying object, as well as to provide an improved aerial camera system therefor.

In this case, the aim is, in particular, to enable an improved compensation of those distortions that are caused by the different exposure times of the respective sensor lines—which exposure times are governed by the slit diaphragm shutter.

This object is achieved by the embodiment of the characterizing features of the independent claims. Features that the invention develops in an alternative or advantageous way are to be gathered from the dependent patent claims.

The invention relates to a method for correcting a distortion, caused by a forward flight direction, in an aerial photograph that is taken with an aerial camera from a flying object.

The aerial photograph is captured by a surface sensor, having a multiplicity of photosensitive pixels, of the aerial camera. According to the invention, use is made in this case of a slit diaphragm shutter, the slit diaphragm being displaced over the surface sensor and over a projected image at a known, in particular constant, speed. Consequently, the individual sensor lines—extending along the slit diaphragm aperture—of the surface sensor are respectively exposed at different, successive exposure times, so that an image of a terrain strip is respectively sensed at different exposure times by the sensor lines.

As already mentioned at the beginning, in the case of aerial photographs the projected image of a terrain section drifts in relation to the surface sensor due to the forward flight movement of the flying object.

The corresponding drift rate of the image in relation to the surface sensor depends in this case, inter alia on the air speed and the imaging scale, the imaging scale being determined from the focal length and the relative flight altitude above the captured terrain. If, for example, the terrain captured in the course of aerial photography has a varying altitude profile, the drift rate of various areas of the projected image relative to the surface sensor likewise varies in magnitude.

Consequently, according to the invention, the individual sensor lines are respectively assigned a relative flight altitude, in particular current at the exposure time, above the terrain strip sensed by the respective sensor line.

Depending on the respectively assigned relative flight altitude, a forward movement compensation factor is now respectively determined separately for the individual sensor lines, and the distortion in the aerial photograph is corrected in likewise fashion with the aid of the respective compensation factor.

In this case, it is respectively possible, for example, to adopt a mean instant during the respective exposure time of the individual sensor lines as the exposure time of the individual sensor lines, so that a concrete exposure time of the respective sensor lines can be defined fictively as a function of the start of exposure and/or of the exposure end time.

In one example, the sensor lines may correspond to the rows of the surface sensor, specifically in the case when the curtains of the slit diaphragm—and thus also of the slit—are aligned parallel to the sensor rows. Alternatively, however, the curtains can also be arranged obliquely and/or rotated in relation to the sensor rows. In these cases, those pixels of the surface sensor that are aligned along the slit or running in fictive lines are respectively combined as the sensor lines. The pixels that are respectively combined in such a case to form a sensor line can, for example, be determined with the aid of interpolation.

In accordance with one embodiment of the invention, the relative flight altitudes, over the sensed terrain strip, respectively assigned to the sensor lines can be determined taking account of a known digital 3D model of the overflown terrain.

Such a 3D terrain model can in this case either already be known and stored ready for retrieval in a memory, and/or not be acquired and set up until during the flight. For example, to this end the terrain can be measured with the aid of a laser scanner—in particular at the same time as the capture of the aerial photographs—and the digital 3D model can be set up therefrom, the sensing range of the laser scanner being, for example, arranged ahead of the capture range of the aerial camera in the flight direction.

As already known, the respective compensation factor determined, in particular, as a function of measured data of a satellite navigation system carried along in the flying object (such as air speed, position, absolute flight altitude of the flying object, etc.) and as a function of measured data of an inertial sensor unit "IMU" (such as yaw, longitudinal inclination and transverse inclination angle of the flying object).

In addition, it is preferred also to include the focal length of the aerial camera in order to derive the compensation factor, since the drift rate of the image relative to the surface sensor depends both on the relative flight altitude—which is taken into account in a likewise fashion according to the invention for the purpose of distortion compensation, and on the focal length.

These further input data (GPS, IMU, focal length) on which the respective compensation factors likewise depend, can, for example, be taken into account jointly for all or some sensor lines (particularly in the case when the flying object is progressing in a comparatively constant fashion over the total exposure time of the surface sensor, and the focal length is not changing, so that these input data do not change substantially). Alternatively, these input data can, however, also—as for relative flight altitude, according to the invention—be acquired currently for the individual line sensors at the respective exposure times, and be taken into account in determining the respective compensation factor.

That is to say, either, for example, a common air speed, a common focal length of the camera, etc., can be assumed for all compensation factors of the individual sensor lines, or else these parameters are acquired individually for the sensor lines at the respective exposure times and—in order to derive the compensation factors—are assigned to the sensor lines.

Furthermore, the invention relates to a method for taking, with an aerial camera from a flying object, an aerial image of an overflown terrain by using a slit diaphragm shutter, a distortion, caused by a forward flight movement of the flying object, in the taken aerial image being corrected with the aid of the abovedescribed inventive compensation method.

The inventive aerial camera system for taking, from a flying object, aerial images of an overflown terrain, has an objective, a surface sensor—having a multiplicity of photosensitive pixels—a slit diaphragm shutter, displaceable over a projected image, for exposing individual sensor lines, in particular rows, of the surface sensor at respectively different, successive exposure times, so that the sensor lines respectively sense a terrain strip of the overflown terrain at the different exposure times, and an electronic data processing unit. The data processing unit is designed in this case to carry out at least the following steps of the abovedescribed inventive compensation method:

respectively assigning to the individual sensor lines a relative flight altitude, in particular current at the exposure time, above the terrain strip sensed by the respective sensor line, and respectively determining separately for each sensor line a compensation factor that depends on an air speed of the flying object, a focal length of the aerial camera and the relative flight altitude assigned to the respective sensor line, and correcting, in linewise fashion, distortion, caused by a forward flight movement, in the aerial photograph with the aid of the respective compensation factor.

In particular, it is possible in this case to provide a memory for a digital 3D model of the overflown terrain so that the data processing unit can respectively derive in linewise fashion from the knowledge of the stored digital 3D model the relative flight altitudes above the terrain strips sensed with the sensor lines.

In accordance with one embodiment, it is possible in addition for a laser scanner to be present for measuring the terrain, it being possible for the sensing range of the laser scanner to be aligned in such a way that said sensing range is arranged ahead of the capture range of the aerial camera in the flight direction. It is thereby rendered possible both for the digital 3D model to be derived, and for the aerial images to be taken and compensated in linewise fashion—as a function of the respective relative flight altitude—during a flight.

Furthermore, the invention relates to a computer program product that is stored on a machine readable carrier, or a computer data signal, embodied by an electromagnetic wave, with program code for carrying out at least the following steps of the abovedescribed inventive compensation method:

respectively assigning to the individual sensor lines a relative flight altitude, in particular current at the exposure time, above the terrain strip sensed by the respective sensor line, and respectively determining separately for each sensor line a compensation factor that depends on an air speed of the flying object, a focal length of the aerial camera and the relative flight altitude assigned to the respective sensor line, and correcting, in linewise fashion, distortion, caused by a forward flight movement, in the aerial photograph with the aid of the respective compensation factor.

BRIEF DESCRIPTION OF THE DRAWINGS

The inventive method and the inventive device are described in more detail below purely by way of example with the aid of figures illustrated schematically in the drawings, and of concrete exemplary embodiments, further advantages of the invention also being explored. In detail:

FIG. 1 shows a surface sensor 4 of which the sensor lines 6 are respectively exposed at different instances with the aid of a slit diaphragm shutter 7;

FIG. 2 shows a total capture range 12 of an aerial camera 2 carried by an aircraft, and a terrain strip 9 captured at a concrete exposure time—on the basis of the position of the slit shutter;

FIG. 3 shows an aerial camera 2—which is moved forward relative to the overflown terrain 8—during the taking of an aerial photograph 1;

FIG. 4 shows an aircraft with an aerial camera 2, with an aerial photograph 1 being taken of a terrain having various profile elevations;

FIG. 5 shows the aerial photograph 1 captured from FIG. 4, firstly as corrected by means of a constant compensation factor, and secondly as corrected with the aid of the inventive method using a compensation factor respectively determined separately for each sensor line;

FIG. 6 shows a surface sensor 4, an obliquely aligned slit diaphragm shutter 7 being used to expose sensor lines 6, respectively miming obliquely, at different instances;

FIG. 7 shows an inventive aerial camera system; and

DETAILED DESCRIPTION

Figure 8:
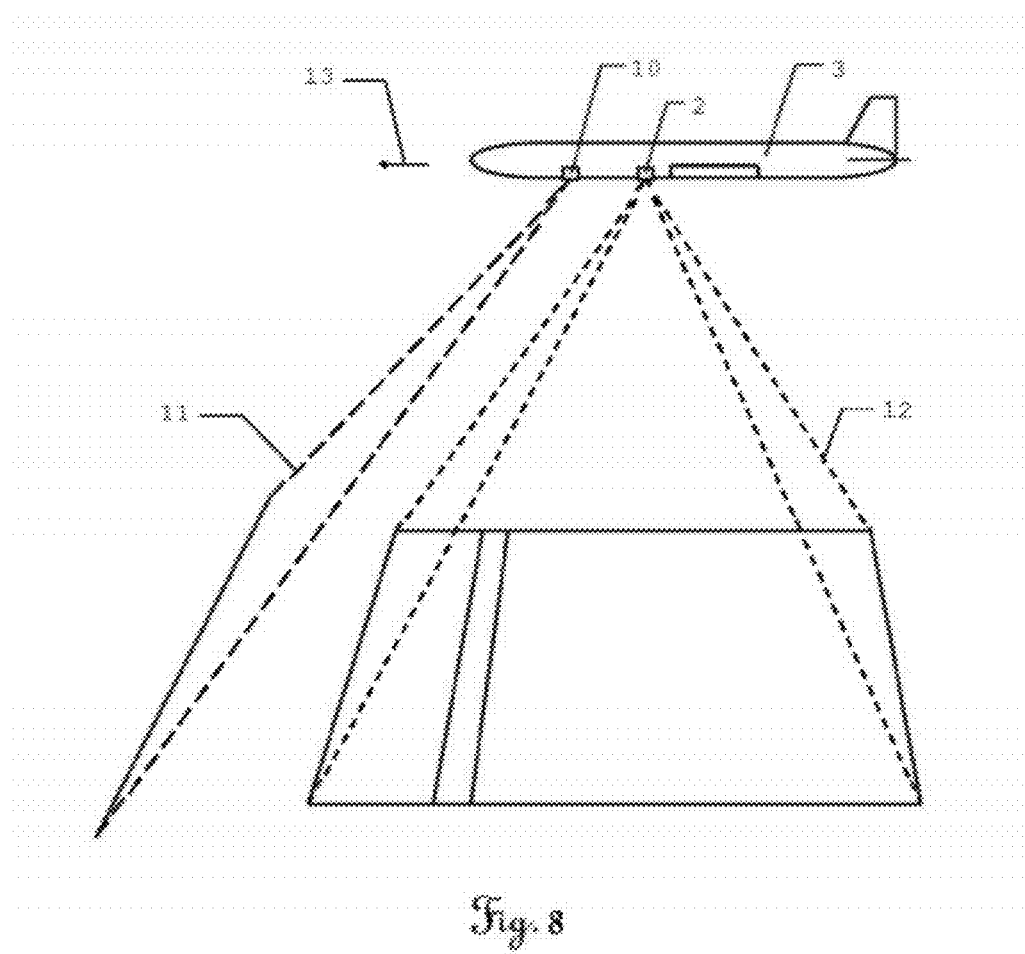
FIG. 8 shows an inventive measuring apparatus with a further pupil opening of the eyepiece in comparison with a measuring apparatus of the prior art with a direct viewing channel and smaller pupil opening of the eyepiece.

FIG. 1 shows a surface sensor 4 of which the sensor lines 6 are respectively exposed at different instances with the aid of a slit diaphragm shutter 7.

In the case of the slit diaphragm shutter 7—which is applied in the context of the inventive method and system—use is made of two diaphragm elements, which are also denoted as curtains. In the basic position, in which no exposure takes place, a first one of the two curtains is closed such that said curtain completely covers the sensor, whereas the second curtain 23 is open and does not cover the sensor. In order to take a photograph, the first curtain 22 opens and moves at a known speed over the image. As soon as the desired exposure time is reached for the sensor line firstly exposed by the opening of the first curtain 22, the second curtain 23 begins to close and move over the image at, for example, a constant speed—and in the same direction as the first curtain 22. A slit diaphragm thereby rolls or runs over the image, as it were.

The consequence of this type of diaphragm shutter is that individual points of the surface sensor 4 (that is to say, the sensor lines 6 respectively exposed and covered over again successively in time for the purpose of exposure) are exposed at different instances. Consequently, the respective sensor lines 6 have different mean exposure times.

Consequently, it is possible—in comparison with the duration of exposure for central diaphragms—for the duration of exposure of the individual sensor lines 6 to be greatly shortened. It is true that image fading and/or motion blur can thereby be reduced in photographs of objects moving relative to the camera. However, since in the case of aerial photographs 1 the projected image is moved relative to the sensor and relative to the curtain slit diaphragm by the forward flight movement, the effect of the different exposure times of the individual sensor lines 6 is that the aerial image of the terrain as sensed by the sensor is either compressed, that is to say squashed, or stretched, that is to say drawn out in length, depending on whether the slit diaphragm is displaced in the same or opposite direction as the projected image over the surface sensor 4.

FIG. 2 shows a flying object 3 that carries an aerial camera 2 with a slit diaphragm shutter 7.

During the exposure time or integration time for, for example, a grid square on the surface of the earth which lies in the total capture range 12 of the aerial camera 2, there is a resulting displacement—owing to the forward flight movement—of the grid square to be captured with reference to the aerial camera 2 arranged in the flying object.

Depending on the instantaneous position of the curtains of the slit diaphragm shutter 7—at a specific instant during the total exposure time of the surface sensor 4 of the aerial camera 2, it is respectively only one or a few sensor lines 6 of the surface sensor 4 that are exposed, and these respectively sense only a very narrow terrain strip 9 lying in the grid square. The individual sensor lines 6 are therefore respectively exposed at different mean exposure times.

For this reason—specifically since the sensor lines 6 of the surface sensor 4 are respectively exposed successively by the slit diaphragm shutter 7—the individual terrain strips 9 of the terrain grid square lying in the total capture range 12 are also sensed successively at different instances. Owing to the forward flight movement, in this case the projected image of the terrain grid square is displaced relative to the surface sensor 4 during the total exposure time.

FIG. 3 shows a procedure for taking an aerial image, for example at two concrete instances during the total exposure time. The aerial camera 2 has a slit diaphragm shutter 7 such that a slit rolls over the projected image in order to expose the surface sensor 4.

At a first instant, the flying object 3 is located in a first flight position, and a first grid square (or a first rectangular area) of the overflown terrain 8 lies in the total capture range 12 of the aerial camera 2. At this instant, the slit of the diaphragm shutter exposes only a few sensor lines 6, in each case only a narrow terrain strip 9 of the terrain lying in the total capture range 12 being sensed with the aid of the sensor lines 6.

At a second, subsequent instant, the flying object 3 is already located in a second position—owing to the forward flight movement—so that now—in relation to the first rectangular area—a second rectangular area, displaced in the flight direction 13, of the overflown terrain 8 lies in the total capture range 12 of the camera. The slit, which rolls over the surface sensor 4 for the purpose of taking a photograph, is also in the meantime in a second position, and so further, although once again only a few, sensor lines 6 of the surface sensor 4 are exposed at this instant for the purpose of exposure, and sense a narrow terrain strip 9.

In the case shown, the slit rolls counter to the flight direction 13 over the surface sensor 4. Consequently, as an aerial photograph is being taken 1 (that is to say owing to the rolling of the slit diaphragm over the entire image, and successively performed exposure the individual sensor lines 6) a region of the overflown terrain 8 that has an extent exceeding the actual capture range 12 of the aerial camera 2 is finally sensed. However, this larger, actually captured region of the terrain is captured in a squashed fashion.

It is now possible to rectify the compressed photograph with the aid of a compensation factor that depends, in particular, on the flight altitude above the terrain, the air speed, the exposure times of the individual sensor lines 6 (which result from the rolling speed and rolling direction 18 of the slit diaphragm), and on the focal length of the aerial camera 2.

The integrated correction of the aerial photograph 1 with the aid of a single such compensation factor functions acceptably in general as long as the terrain overflown and captured is flat—and it is therefore possible to assume that the flight altitude above the terrain strips 9 respectively successively captured during the taking 1 of the aerial photograph can be taken as substantially constant—and also as long as the air speed, focal length, etc. do not change substantially during the total exposure duration of the surface sensor 4.

The slit diaphragm shutter 7 of the aerial camera 2 in FIG. 4 rolls over the surface sensor 4 in the flight direction 13 (and also in that direction in which the projected image drifts relative to the surface sensor 4). Consequently, in this case a taken aerial image has an extent of the captured terrain as the distortion caused by the forward flight movement.

As may be seen in FIG. 4, additionally, the overflown terrain 8 has a varying profile elevation, and so the relative flight altitude above the terrain strips 9 successively sensed with the aid of the individual sensor rows also varies sharply. Consequently, the drift rate of various regions of the projected image relative to the surface sensor 4 and relative to the slit diaphragm also varies in level.

If an aerial image of the overflown terrain 8 that has been taken in this case is now corrected with the aid of a single compensation factor applied for the entire surface sensor 4 (the relative flight altitude above the house which is deeper in the terrain, for example, being taken into account in order to derive the compensation factor), this yields the aerial photograph 1 illustrated on the left in FIG. 5. The lower region of this corrected aerial photograph 1, for which the relative flight altitude above the more deeply situated house was taken into account, could then be acceptably rectified so that the lower house is represented in a substantially faithful fashion. However, since the drift rate of the image of the house situated higher up, which is projected onto the sensor lines 6, was higher during the taking of the photograph, this region is reproduced in a stretched or extended fashion in the aerial photograph 1—despite being corrected with the aid of the compensation factor applied in standard fashion to the entire surface sensor 4.

According to the invention, the individual sensor lines 6 are now respectively assigned a relative flight altitude, in particular current in relation to the exposure time, above the terrain strip 9 sensed by the respective sensor line.

Depending on the respectively assigned relative flight altitude, a forward movement compensation factor is respectively determined separately for the individual sensor lines 6, and the distortion in the aerial photograph 1 is corrected in linewise fashion with the aid of the respective compensation factor.

It is also now possible to take account when correcting distortion—in terms of time or region—of varying drift rates by means of the inventive compensation, performed in linewise (or, in particular, row wise) fashion, of the drift caused by the forward flight movement.

The right hand illustration in FIG. 5 shows an aerial image that was taken of the overflown terrain 8 from FIG. 4, the aerial image having been corrected with the aid of the inventive method in likewise fashion—that is to say as a function of the respective relative flight altitude above the terrain strip 9 sensed by the individual sensor lines 6 at different exposure times. A compensation factor is derived separately for each sensor line. Since the compensation factor depends on the respective relative flight altitude and, in particular, on air speeds respectively current at the exposure time of the sensor lines 6, focal length, IMU measured data, etc., it is also possible to take account, for the distortion compensation, of rough terrain profiles and of the air speeds that change during the total exposure time, focal length, aircraft wobbles, etc.

By way of example, a mean instant during the respective exposure time of the individual sensor lines 6 can respectively be adopted as the exposure time of the individual sensor lines 6, so that a concrete exposure time of the respective sensor lines 6 can be defined fictively as a function of the start of exposure and/or of the final instant of exposure.

If the overflown terrain 8 in this case likewise has a varying elevation profile along the terrain strips 9 successively sensed individually with the aid of the sensor lines 6, the relative flight altitude above the respective terrain strip 9, for example a mean elevation above the terrain strip 9, can be derived as the relative flight altitude and be used to determine the respective compensation factor.

As may be seen from the aerial photograph 1 illustrated on the right in FIG. 5, the house situated higher and the neighboring automobile can also now be faithfully reproduced in the aerial photograph 1 compensated with the aid of the inventive method.

As illustrated in FIG. 6, the curtains can also be aligned in relation to the surface sensor 4 in a rotated (that is to say oblique) fashion, and/or roll obliquely over the surface sensor 4.

This can be useful if the axis of arrangement of the surface sensor 4 does not correspond exactly to the flight direction 13, for example due to crab steering of the flying object 3 caused by a side wind, or because the surface sensor is not aligned exactly in relation to the longitudinal axis of the flying object 3.

Those pixels 5 that respectively have a substantially common, identical exposure time due to the alignment of the slit in relation to the surface sensor 4 can then be combined to form a sensor line. The pixels 5 that are respectively combined in such a case to form a sensor line 21 can be determined, for example, with the aid of interpolation.

That is to say, the pixels 5 of the surface sensor 4 that are respectively exposed at substantially the same instants are located in this case along fictive lines 20 that lie parallel to the edges 19 of the curtains of the slit diaphragm shutter 7.

Depending on the resolution of the surface sensor 4 and the required accuracy of the compensation method formed in linewise fashion, it is also possible according to the invention to combine two or a few pixel rows that lie along a fictive line 20 aligned parallel to the direction of extent of the slit to form a sensor line 21 in each case. It is thereby possible for a sensor line also to have a width of in each case, for example, 2, 3 or 4 pixels 5 in the column direction (that is to say, a few pixels 5 in the column direction of the surface sensor 4 per defined sensor line).

The sensor lines 6 can then, for example, be associated and stored with their respective exposure times—conditioned by the roll rate and roll direction 18 of the slit diaphragm.

FIG. 7 shows an inventive aerial camera system for taking, from a flying object 3, aerial photographs of an overflown terrain 8. The aerial camera system in this case has an objective 17, a surface sensor 4—having a multiplicity of photosensitive pixels 5—a slit diaphragm shutter 7, displaceable over a projected image, for exposing individual sensor lines 6, in particular rows, of the surface sensor 4 at respectively different, successive exposure times, so that the sensor lines 6 respectively sense a terrain strip 9 of the overflown terrain 8 at the different exposure times, and an electronic data processing unit 16. The data processing unit 16 is designed in this case for carrying out at least the following steps of the above-described inventive compensation method:

respectively assigning to the individual sensor lines 6 a relative flight altitude, in particular current at the exposure time, above the terrain strip 9 sensed by the respective sensor line, and respectively determining separately for each sensor line a compensation factor that depends on an air speed of the flying object 3, a focal length of the aerial camera 2 and the relative flight altitude assigned to the respective sensor line, and correcting, in linewise fashion, distortion, caused by a forward flight movement, in the aerial photograph 1 with the aid of the respective compensation factor.

In this case, the respective compensation factor can be determined by the data processing unit 16 as a function of measured data of a satellite navigation system 14 carried along in the flying object 3, and, in particular, an inertial sensor unit 15.

In FIG. 8, the aerial camera system is additionally assigned a laser scanner 10 ("Airborne LIDAR Sensor") for measuring the terrain, the sensing range 11 of the laser scanner 10 being aligned in such a way that said sensing range is arranged ahead of the capture range 12 of the aerial camera 2 in the flight direction 13. As a result of this, it is possible during a flight both to derive the digital 3D model (from the measurements of the laser scanner 10), as well as to take the aerial images and compensate them in likewise fashion—as a function of the respective relative flight altitude.

In particular, it is possible in this case to provide a memory for a digital 3D model of the overflown terrain 8 such that the data processing unit 16 can respectively derive in linewise fashion from the knowledge of the stored digital 3D model the relative flight altitudes above the terrain strips 9 sensed with the aid of the sensor lines.

It is obvious that these figures as illustrated are only schematics of possible exemplary embodiments. According to the invention, the various approaches can equally be combined with one another as well with methods for compensating a distortion caused by a forward flight movement, and with aerial camera systems of the prior art.

What is claimed is:

1. A method for correcting a distortion, caused by a forward flight movement, in an aerial photograph that is taken with an aerial camera from a flying object, the method comprising:
   the aerial photograph being captured by a surface sensor of the aerial camera, the surface sensor having a multiplicity of photosensitive pixels, and sensor lines being exposed at different exposure times with a slit diaphragm shutter displaced over a projected image, so that individual sensor lines each sense a terrain strip of overflown terrain at different exposure times;
   each of the individual sensor lines being assigned a flight altitude, current at an exposure time, above the terrain strip sensed by the individual sensor line; and
   there being determined, separately for each individual sensor line, a compensation factor that depends on an air speed of the flying object, on a focal length of the aerial camera and on the flight altitude assigned to the sensor line, and the distortion in the aerial photograph being corrected in linewise fashion with a compensation factor.

2. The method as claimed in claim 1, wherein the flight altitude assigned to the sensor lines is determined by taking account of a known digital 3D model of the overflown terrain.

3. The method as claimed in claim 2, wherein the terrain is measured with aid of a laser scanner and the digital 3D model is set up therefrom, a sensing range of the laser scanner specifically being arranged ahead of a capture range of the aerial camera in a flight direction.

4. The method as claimed in claim 2, wherein the terrain is measured with aid of a laser scanner at the same time as the capture of the aerial photographs and the digital 3D model is set up therefrom, a sensing range of the laser scanner specifically being arranged ahead of a capture range of the aerial camera in a flight direction.

5. The method as claimed in claim 1, wherein the compensation factor is determined as a function of measured data of a satellite navigation system carried along in the flying object and, in particular, an inertial sensor unit.

6. The method as claimed in claim 1, wherein the compensation factor for the sensor lines is determined as a function of the air speed of the flying object that is current for an exposure time of the sensor lines.

7. The method as claimed in claim 1, wherein the compensation factor for the sensor lines is determined for production of an imaging scale of the image defined by:
   the flight altitude; and
   the focal length, current at an exposure time, of the aerial camera.

8. The method as claimed in claim 1, wherein the compensation factor for the sensor lines is determined as a function of at least one of the following angles of the flying object:
   a yaw angle;
   a longitudinal inclination angle; and
   a transverse inclination angle,
   the angles being assigned to the sensor lines.

9. The method as claimed in claim 1, wherein the compensation factor for the sensor lines is determined as a function of at least one of the following angles of the flying object:
- a yaw angle at an exposure time;
- a longitudinal inclination angle current at an exposure time; and
- a transverse inclination angle current at an exposure time, the angles being assigned to the sensor lines.

10. A method for taking, with an aerial camera from a flying object, an aerial image of an overflown terrain, comprising:
- the aerial image being captured by a surface sensor of the aerial camera, the surface sensor having a multiplicity of photosensitive pixels, and sensor lines being exposed at different, successive exposure times with aid of a split diaphragm shutter displaced over a projected image, so that each individual sensor line senses a terrain strip of overflown terrain at a different exposure time; and
- each of the individual sensor lines being assigned a flight altitude, current at an exposure time, above a terrain strip sensed by the individual sensor line; and
- there being determined, separately for the individual sensor lines, a compensation factor that depends on an air speed of the flying object, on a focal length of the aerial camera and on the flight altitude assigned to the sensor line, and a distortion in an aerial photograph being corrected in linewise fashion with a compensation factor.

11. An aerial camera system for taking, from a flying object, aerial images of an overflown terrain, having:
- an objective;
- a surface sensor having a multiplicity of photosensitive pixels;
- a slit diaphragm shutter, displaceable over a projected image, for exposing individual sensor of the surface sensor at different, successive exposure times, so that sensor lines sense a terrain strip of the overflown terrain at different exposure times; and
- an electronic data processing unit for carrying out at least the following steps of a method comprising:
  - assigning to individual sensor lines a flight altitude, current at an exposure time, above the terrain strip sensed by each sensor line, and
  - determining separately for each sensor line a compensation factor that depends on an air speed of the flying object, a focal length of the aerial camera and the flight altitude assigned to the sensor line, and
  - correcting, in linewise fashion, distortion, caused by a forward flight movement, in the aerial photograph with aid of the compensation factor.

12. The aerial camera system as claimed in claim 11, wherein a memory is provided for a digital 3D model of the overflown terrain, and the data processing unit is designed to derive the flight altitudes, assigned in linewise fashion, from knowledge of a stored digital 3D model.

13. The aerial camera system as claimed in claim 12, wherein:
- a laser scanner is present for measuring the terrain, a sensing range of the laser scanner being aligned in such a way that said sensing range is arranged ahead of a capture range of the aerial camera in a flight direction; and
- the electronic data processing unit is designed for setting up the digital 3D model from measured data of the laser scanner, and for storing the 3D model.

14. A non-transitory computer program product with program code for carrying out at least the following steps:
- assigning to individual sensor lines a flight altitude above a terrain strip sensed by a sensor line; and
- determining separately for each sensor line a compensation factor that depends on an air speed of a flying object, a focal length of an aerial camera and a flight altitude assigned to each sensor line; and
- correcting, in linewise fashion, distortion, caused by a forward flight movement, in an aerial photograph with aid of the compensation factor.

15. The non-transitory computer program product as in claim 14, wherein the steps are executed in an electronic data processing unit and wherein the act of assigning to the individual sensor lines a flight altitude is performed current at an exposure time above the terrain strip sensed by the individual sensor line.

* * * * *